United States Patent
Chen

(10) Patent No.: US 7,958,808 B2
(45) Date of Patent: Jun. 14, 2011

(54) VIBRATION-REDUCING DEVICE FOR A SCROLL SAW

(75) Inventor: Jung-Huo Chen, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 364 days.

(21) Appl. No.: 12/213,888

(22) Filed: Jun. 26, 2008

(65) Prior Publication Data

US 2009/0025527 A1 Jan. 29, 2009

(30) Foreign Application Priority Data

Jul. 26, 2007 (TW) .............................. 96127170 A

(51) Int. Cl.
*B23D 49/00* (2006.01)
*B23D 51/00* (2006.01)
*B23D 51/20* (2006.01)

(52) U.S. Cl. .......................... 83/748; 83/783; 83/699.21

(58) Field of Classification Search ............ 83/781–786, 83/746, 748, 615, 699.21, 699.51, 698.71, 83/581.1, 777

See application file for complete search history.

(56) References Cited

U.S. PATENT DOCUMENTS

| 3,213,909 | A | * | 10/1965 | Kivimaa | 83/777 |
| 4,455,909 | A | * | 6/1984 | Wilbs | 83/777 |
| 4,503,742 | A | | 3/1985 | Sutton | |
| 4,616,541 | A | * | 10/1986 | Eccardt et al. | 83/98 |
| 4,625,609 | A | | 12/1986 | Ashworth | |
| 4,646,605 | A | * | 3/1987 | Rice et al. | 83/782 |
| 4,813,322 | A | * | 3/1989 | Rice | 83/748 |
| 5,022,157 | A | * | 6/1991 | Chang | 30/394 |
| 5,065,652 | A | * | 11/1991 | Legler et al. | 83/168 |
| 5,070,752 | A | * | 12/1991 | Chang | 83/78 |
| 5,088,369 | A | * | 2/1992 | Rice et al. | 83/783 |
| 5,390,577 | A | * | 2/1995 | Huang | 83/784 |
| 6,474,211 | B1 | * | 11/2002 | Lin | 83/783 |
| 2002/0083812 | A1 | * | 7/2002 | Lanzer | 83/490 |

* cited by examiner

*Primary Examiner* — Laura M. Lee

(74) *Attorney, Agent, or Firm* — Bacon & Thomas, PLLC

(57) ABSTRACT

A vibration-reducing device is applied to a scroll saw. The scroll saw includes a body, a U-frame, a block and an actuating device. The U-frame is coupled to the body, and the block and a shaft of the actuating device are eccentrically fastened to each other, and the actuating device is mounted to the body. The vibration-reducing device includes a connector and a pivot arm pivotally coupled to the body. The connector includes a third end rotatably connected to the block, and a fourth end rotatably connected to the pivot arm. When the shaft is rotated, the motion of the center of gravity of the pivot arm in a vertical direction is opposite to the motion of the center of gravity of the U-frame.

20 Claims, 6 Drawing Sheets

VIBRATION-REDUCING DEVICE FOR A SCROLL SAW

BACKGROUND

1. Field of the Invention

The present disclosure relates to a vibration-reducing device and more particularly, to a vibration-reducing device for use with a scroll saw.

2. Description of the Related Art

Referring to FIG. 1, a conventional scroll saw 10 comprises a body 12, a U-frame 14, a worktable 16, a saw blade 18, an actuating device 20 and a fan-shaped member 22. The U-frame 14 is mounted to the body 12 and includes an upper arm 24 and a lower arm 26. The worktable 16 is mounted to the body 12 and is located between the upper arm 24 and lower arm 26 for supporting a workpiece (not shown). The saw blade 18 is mounted to the upper arm 24 and lower arm 26 and is passed through the worktable 16. The actuating device 20 includes a motor 28 and is mounted to the body 12 and is configured to synchronously drive the upper arm 24 and lower arm 26 to alternately move upwards and downwards to effect the movement in the up-down direction of the saw blade 18. The fan-shaped member 22 is configured to reduce the degree of vibration in the up-down, or otherwise generally vertical, direction caused during the operation of the conventional scroll saw 10.

Referring to FIG. 2 showing a vertical cross-sectional view taken along a line 1-1 of FIG. 1, the actuating device 20 further includes a shaft 30 and a block 32. The shaft 30 is firmly coupled with the block 32 and a top end of the fan-shaped member 22 is firmly coupled with the shaft 30. The conventional scroll saw 10 further includes a driving member 34. One end of the driving member 34 is pivotally connected to the block 32 with a pivot shaft 36, and the other end is pivotally connected to the lower arm 26. The pivot shaft 36 is also coupled with the block 32 and an axis 38 of the pivot shaft 36 is offset from an axis 40 of the shaft 30.

Referring to FIGS. 1 and 2, the motor 28 is configured to drive the shaft 30 to rotate. When the shaft 30 is rotated, the fan-shaped member 22 is driven to rotate and the pivot shaft 36 is driven to move circularly. The pivot shaft 36 drives the lower arm 26 via the driving member 34 to cause the U-frame 14 to move back and forth in the up-down direction, which leads the saw blade 18 to move upwards and downwards to cut the workpiece. The center-of-gravity position of the fan-shaped member 22 is opposite to the position of the axis 38 of the pivot shaft 36, so that when one of them is located above the axis 40 of the shaft 30 (in the up position), the other one is located below the axis 40 of the shaft 30 (in the down position), such that the movement in the up-down direction of the U-frame 14 is opposite to the up or down position of the fan-shaped member 22. By this way, the movement in the up-down direction of the fan-shaped member 22 is able to reduce the degree of vibration caused by the movement in the up-down direction of the U-frame 14. However, the movement in the left-right direction of the fan-shaped member 22 increases the degree of vibration in the left-right direction for the conventional scroll saw 10.

In order to solve the foregoing problem that the fan-shaped member 22 increases the degree of vibration in the left-right direction for the conventional scroll saw 10, another conventional vibration-reducing device 50 of a scroll saw is provided.

Referring to FIG. 3 showing an exploded view of the conventional vibration-reducing device 50 of the scroll saw, the conventional vibration-reducing device 50 of the scroll saw includes two fan-shaped members 52. The movements of the two fan-shaped members 52 are opposite, so the vibrations in the left-right direction caused respectively by the two fan-shaped members 52 may approximately offset each other.

However, for establishing good vibration reduction, the weight of each conventional fan-shaped member 22, 52 of the scroll saw and its position in the scroll saw should correspond to the weight of the U-frame 14 and also its position in the scroll saw. But when the conventional scroll saws are mass-produced, the weight and the position of the U-frame 14 in each conventional scroll saw cannot be ensured to be completely the same. Accordingly, in view of economic considerations, it is inconvenient and unworkable to specifically make a corresponding fan-shaped member 22, 52 for each conventional scroll saw 10.

SUMMARY

In view of the foregoing, a preferred embodiment of the present disclosure aims to provide a scroll saw incorporating a vibration-reducing device to solve the aforementioned problems of conventional scroll saws.

Accordingly, a scroll saw comprises a body, a U-frame, a worktable, a saw blade, an actuating device, a block, a driving member and a vibration-reducing device. The U-frame is mounted to the body, and includes an upper arm and a lower arm. The worktable is mounted to the body, and is located between the upper arm and lower arm for carrying a workpiece. The saw blade is connected to the upper arm and the lower arm and is passed through the worktable. The actuating device is mounted to the body and has a shaft. The actuating device is configured to drive the shaft to rotate. The block is eccentrically coupled with the shaft. The driving member includes a first end portion rotatably connected to the block and a second end portion rotatably connected to the U-frame, so when the shaft is rotated, the upper arm and lower arm are synchronously driven to move upwards and downwards, or otherwise generally vertically to vertically move the saw blade in the up-down (vertical) direction.

The vibration-reducing device includes a connector and a pivot arm. The connector has a third end portion rotatably connected to the block and a fourth end portion rotatably connected to the pivot arm. The pivot arm is pivotally mounted to the body. When the shaft is rotated, the motion of the center of gravity of the pivot arm in the up-down direction is opposite to the motion of the center of gravity of the U-frame, so vibrations caused by the movement in the up-down (vertical) direction of the U-frame can be reduced.

In the preferred embodiment of the present disclosure, the pivot arm includes two opposite end portions and at least one counterbalance. One of the two end portions is pivotally connected to the body. The counterbalance is mounted to the other one of the two end portions and the fourth end portion of the connector is pivotally mounted between the two end portions of the pivot arm.

The number of the counterbalances used is adjustable according to the degree of vibration caused by the U-frame, so that during mass production of scroll saws, the assembler can adjust the number of counterbalances used according to the degree of vibration of each scroll saw to achieve better vibration reduction.

DETAILED DESCRIPTION OF VARIOUS EMBODIMENTS

Figure 1:
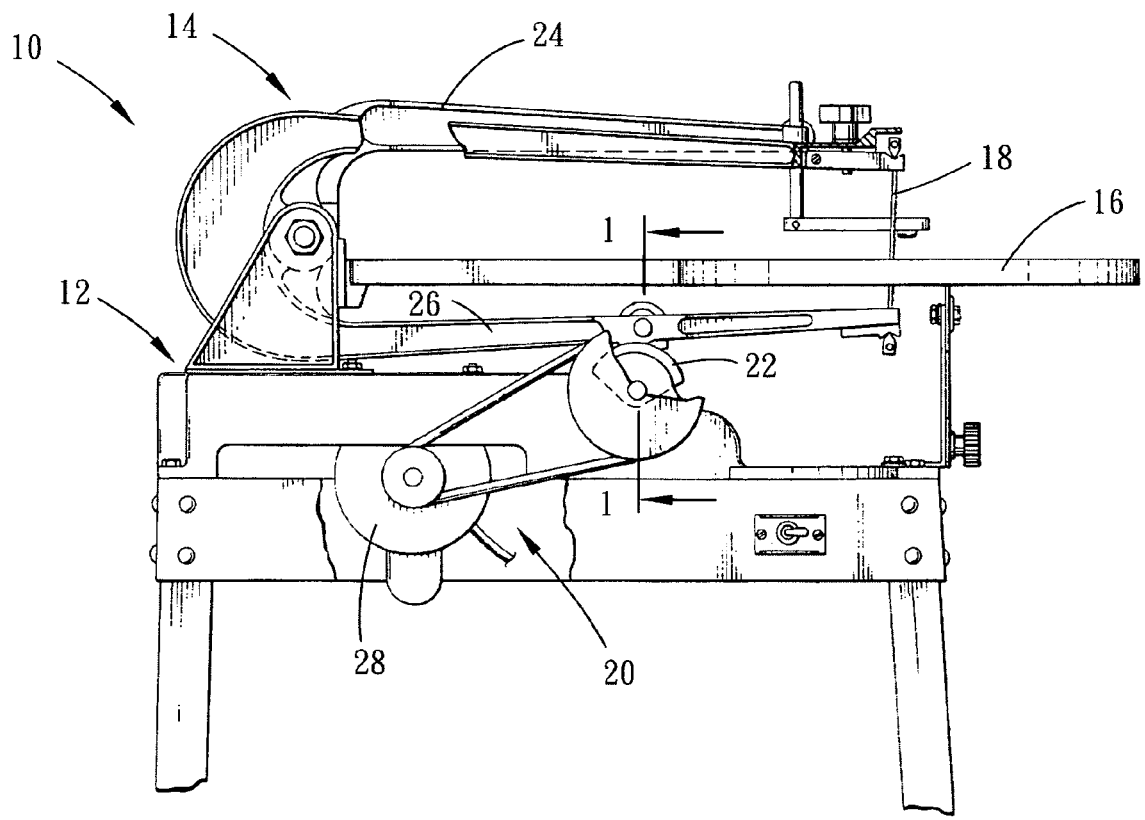
FIG. 1 is a perspective view of a conventional scroll saw.
Figure 2:
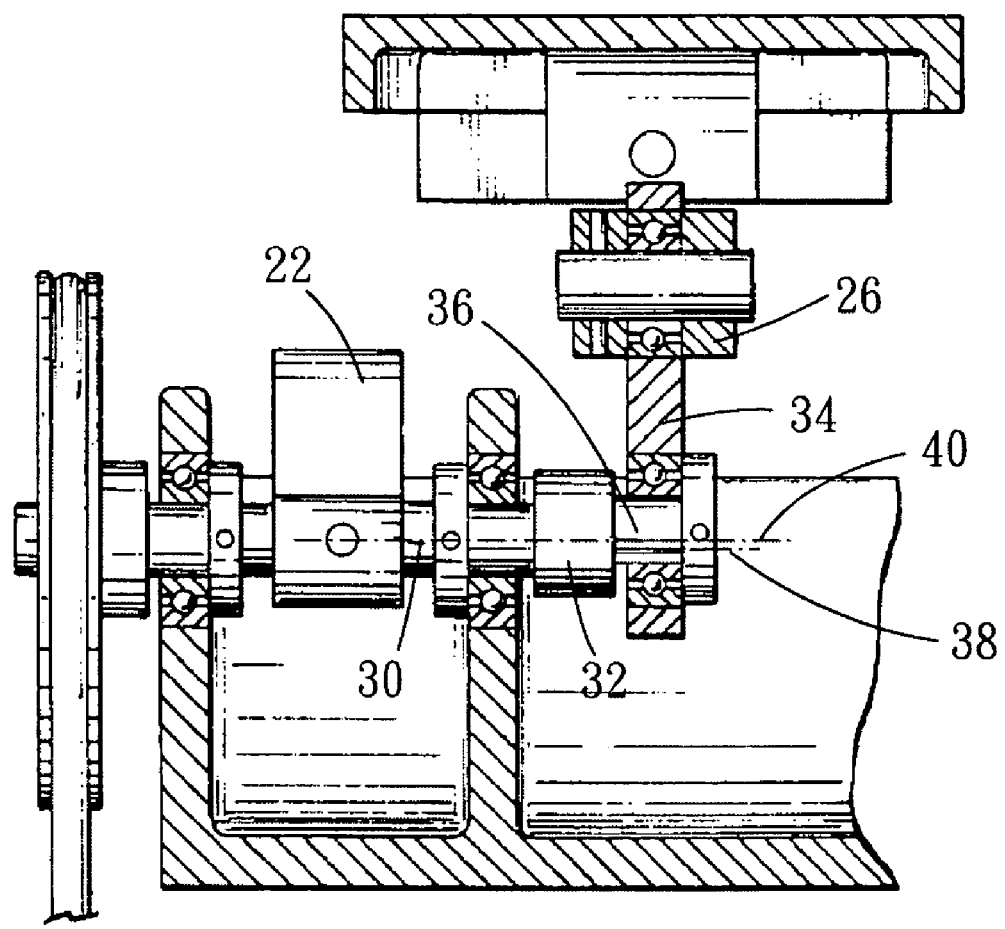
FIG. 2 is a vertical cross-sectional view taken along line 1-1 of FIG. 1.
Figure 3:
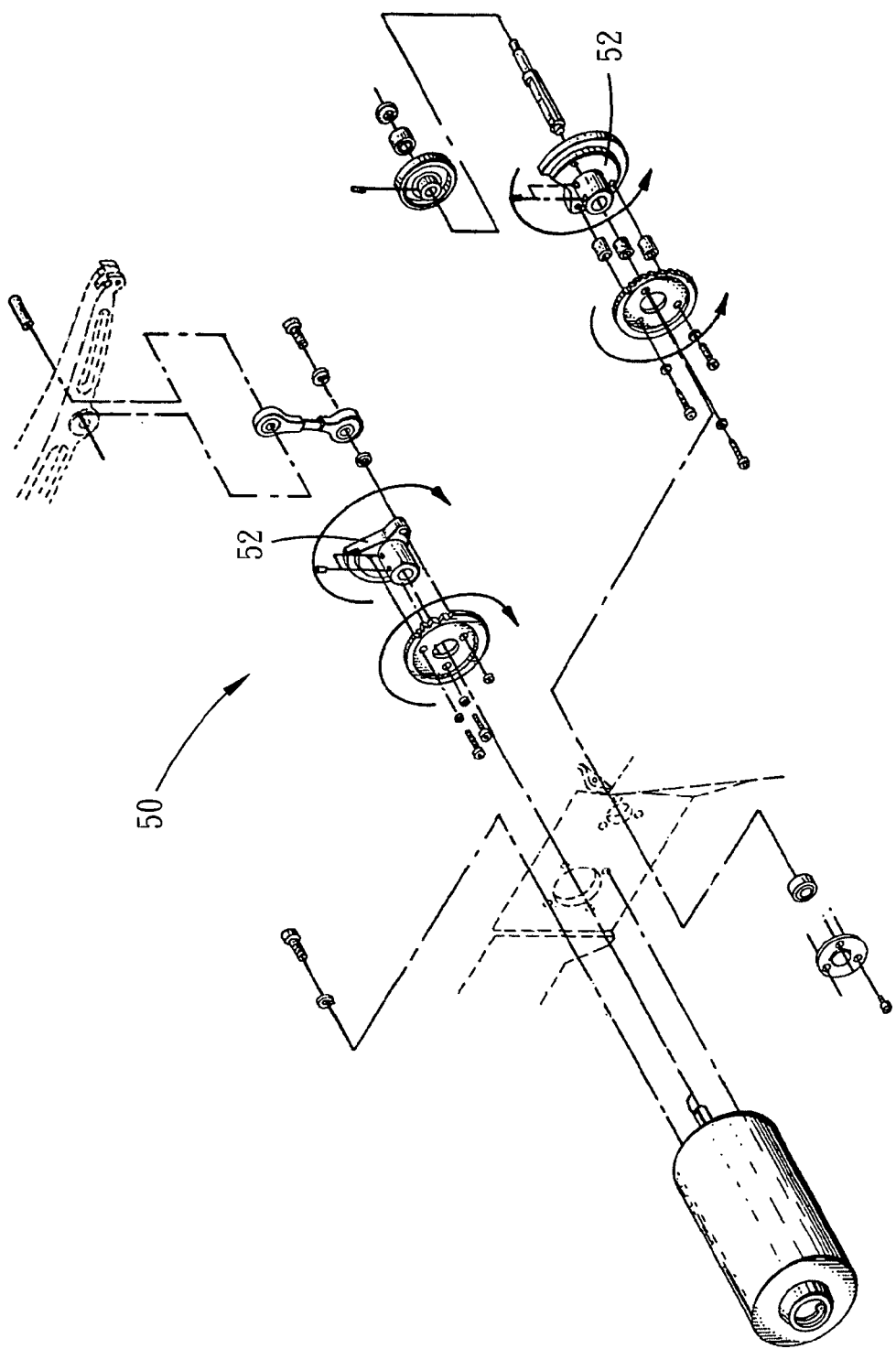
FIG. 3 is an exploded view of another conventional vibration-reducing device of a scroll saw.
Figure 4:
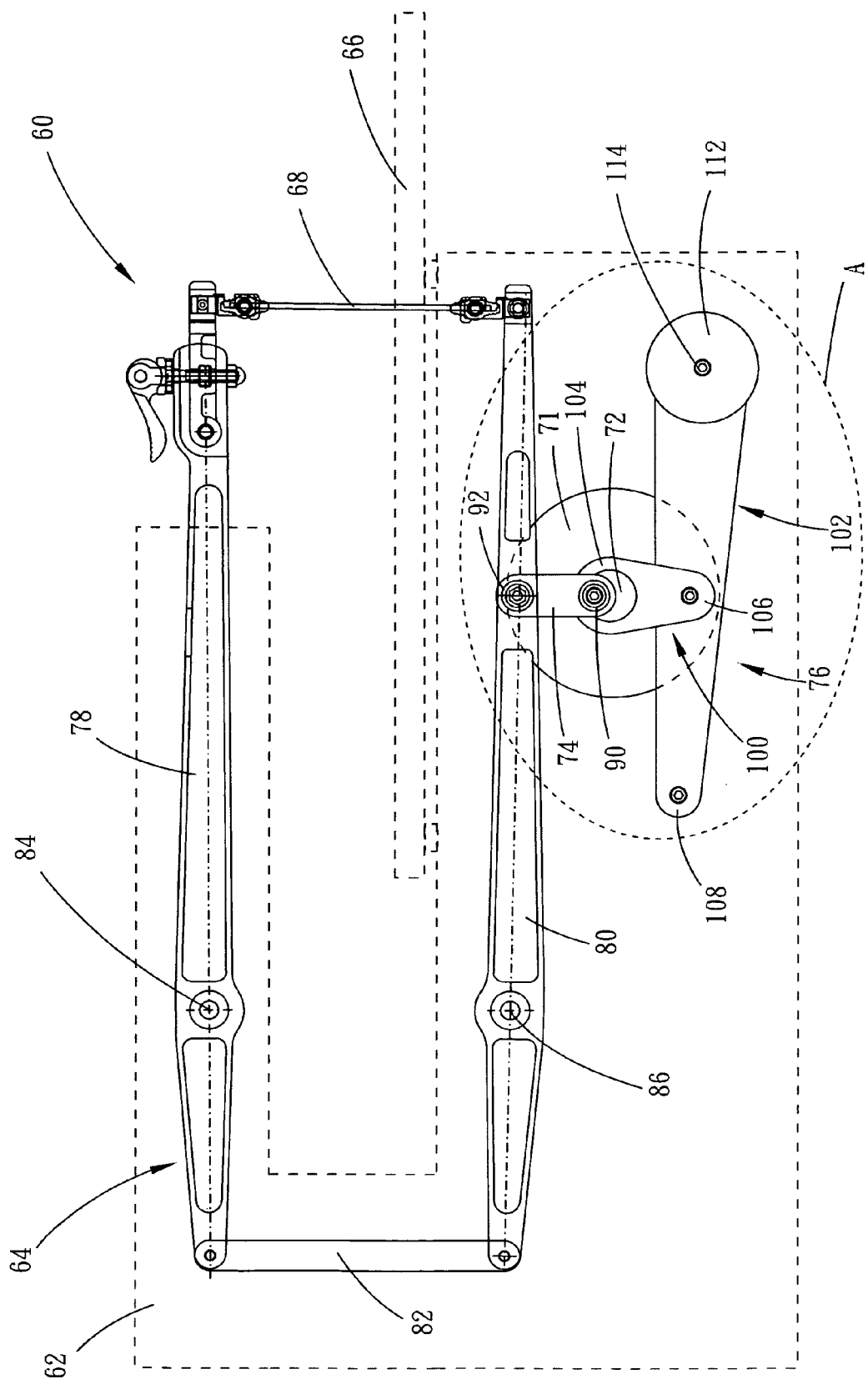
FIG. 4 is a perspective view of inner structure of a scroll saw according to a first embodiment.

Referring to FIG. 4, showing a scroll saw 60 according to a first embodiment of the present disclosure, the scroll saw 60 comprises a body 62, a U-frame 64, a worktable 66, a saw blade 68, an actuating device 70, a block 72, a driving member 74 and a vibration-reducing device 76. The U-frame 64 is mounted to the body 62, and includes an upper arm 78, a lower arm 80 and a link arm 82. The upper arm 78 is pivotally mounted to the body 62 at a first pivot position 84 located at a non-end portion of the upper arm 78. The lower arm 80 is also pivotally mounted to the body 62 at a second pivot position 86 also located at a non-end portion of the lower arm 80. Two ends of the link arm 82 are respectively pivotally connected to one end of the upper arm 78 and one end of the lower arm 80. So when a right side portion of the second pivot position 86 of the lower arm 80 is moved pivotally in the up-down (vertical) direction, a right side portion of the first pivot position 84 of the upper arm 78 is conducted to synchronously move pivotally in the up-down (vertical) direction via the link arm 82. The aforementioned connecting structure between those components of the U-frame 64 and between these components and the body 62 are merely exemplary for purposes of illustration, so the present disclosure is not limited thereby.

The worktable 66 is mounted on the body 62, and is located between the upper arm 78 and the lower arm 80 for carrying a workpiece (not shown). One end of the saw blade 68 is mounted to the other end of the upper arm 78 and the other end of the saw blade 68 is mounted to the other end of the lower arm 80, and the saw blade 68 is passed through the worktable 66.

Figure 5:
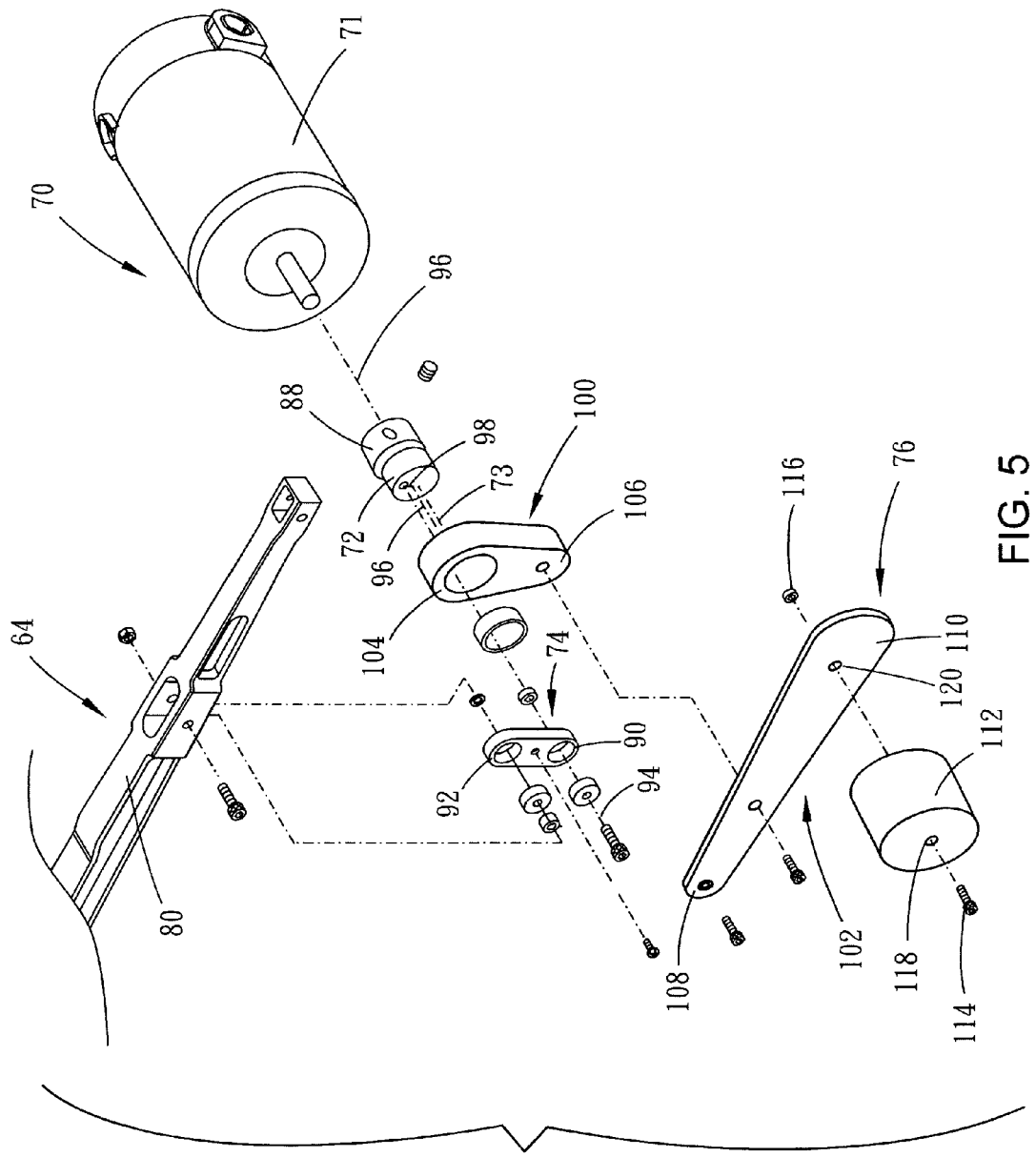
FIG. 5 is an exploded view of section A of FIG. 4.

Referring to FIGS. 4 and 5, FIG. 5 is an exploded view of section A of FIG. 4. The actuating device 70 includes a shaft 88 and a motor 71. The motor 71 is mounted on the body 62 and the shaft 88 in the first embodiment is, for example, an armature of the motor 71. The armature is driven by the motor 71 to rotate around an axis 96. The block 72 is shaped like a cylinder and is eccentrically connected to the shaft 88. The block has an axis 73 offset from the axis 96 of the shaft 88. The driving member 74 has a first end 90 and a second end 92. The first end 90 is pivotally mounted to the block 72 and has a pivot axis 94. The pivot axis 94 is offset from the axis 96 of the shaft 88 and contacts the shortest line section 98 from the axis 96 to the periphery of the block 72. The second end 92 is pivotally mounted to the U-frame 64. In the first embodiment, the second end 92 is pivotally mounted, for example, at the right side portion of the second pivot position 86 of the lower arm 80.

The vibration-reducing device 76 includes a connector 100 and a pivot arm 102. The connector 100 has a third end 104 rotatably coaxially coupled to the block 72 and a fourth end 106 pivotally mounted to the pivot arm 102. In the first embodiment, for example, the fourth end 106 is pivotally mounted between two ends 108, 110 of the pivot arm 102, but the present disclosure is not limited to this position, as long as the connector 100 is able to drive the pivot arm 102 to move in the up-down (vertical) direction. The center of gravity of the pivot arm 102 and the center of gravity of the U-frame 64 are respectively located on opposite sides of the shaft 88. The one end 108 of the pivot arm 102 is pivotally mounted to the body 62. The pivot arm 102 has at least one counterbalance 112 mounted on the other end 110 of the pivot arm 102.

In an exemplary method of mounting the counterbalance 112, the vibration-reducing device 76 further includes a screw bolt 114 and a screw nut 116. The counterbalance 112 and the other end 110 of the pivot arm 102 each respectively include a through hole 118, 120 defined respectively therethrough. The screw bolt 114 is inserted through the through hole 118 of the counterbalance 112 and the through hole 120 of the other end 110 of the pivot arm 102, and the screw nut 116 is screwed onto the screw bolt 114 to fix the counterbalance 112 on the other end 110 of the pivot arm 102.

Whereby, when the shaft 88 of the actuating device 70 is driven by the motor 71 to rotate, the block 72 is rotated. And because the axis 94 of the first end 90 of the driving member 74 is offset from the axis 96 of the shaft 88, the upper arm 78 and lower arm 80 are synchronously driven to move upwards and downwards via the driving member 74 for cutting the workpiece placed on the worktable 66. Further, because the block 72 is eccentrically coupled with the shaft 88 and the third end 104 of the connector 100 is rotatably coaxially coupled to the block 72, the pivot arm 102 is driven to swing in the up-down (vertical) direction via the connector 100. Additionally, because the pivot axis 94 of the first end 90 of the connector 100 contacts the shortest line section 98 from the axis 96 of the shaft 88 to the periphery of the block 72, which means a pivot position of the first end 90 is located on the line section 98, the motion of the center of gravity of the pivot arm 102 in the up-down (vertical) direction is opposite to the motion of the center of gravity of the U-frame 64, and the degree of vibration caused by the movement of the U-frame 64 in the up-down (vertical) direction is reduced. Furthermore, because the motion of the center of gravity of the pivot arm 102 in the up-down (vertical) direction is opposite to the motion of the center of gravity of the U-frame 64, the same effect can also be reached by utilizing a different structural disposition to position the center of gravity of the pivot arm 102 and the center of gravity of the U-frame 64 on the same side of the shaft 88.

In the first embodiment, the number of the at least one counterbalance 112 is adjustable according to the degree of vibration caused by the U-frame 64, so when the scroll saws 60 are in mass production, the assemblers can adjust the number of the counterbalances used according to the degree of vibration of each scroll saw 60 to achieve better vibration reduction.

Figure 6:
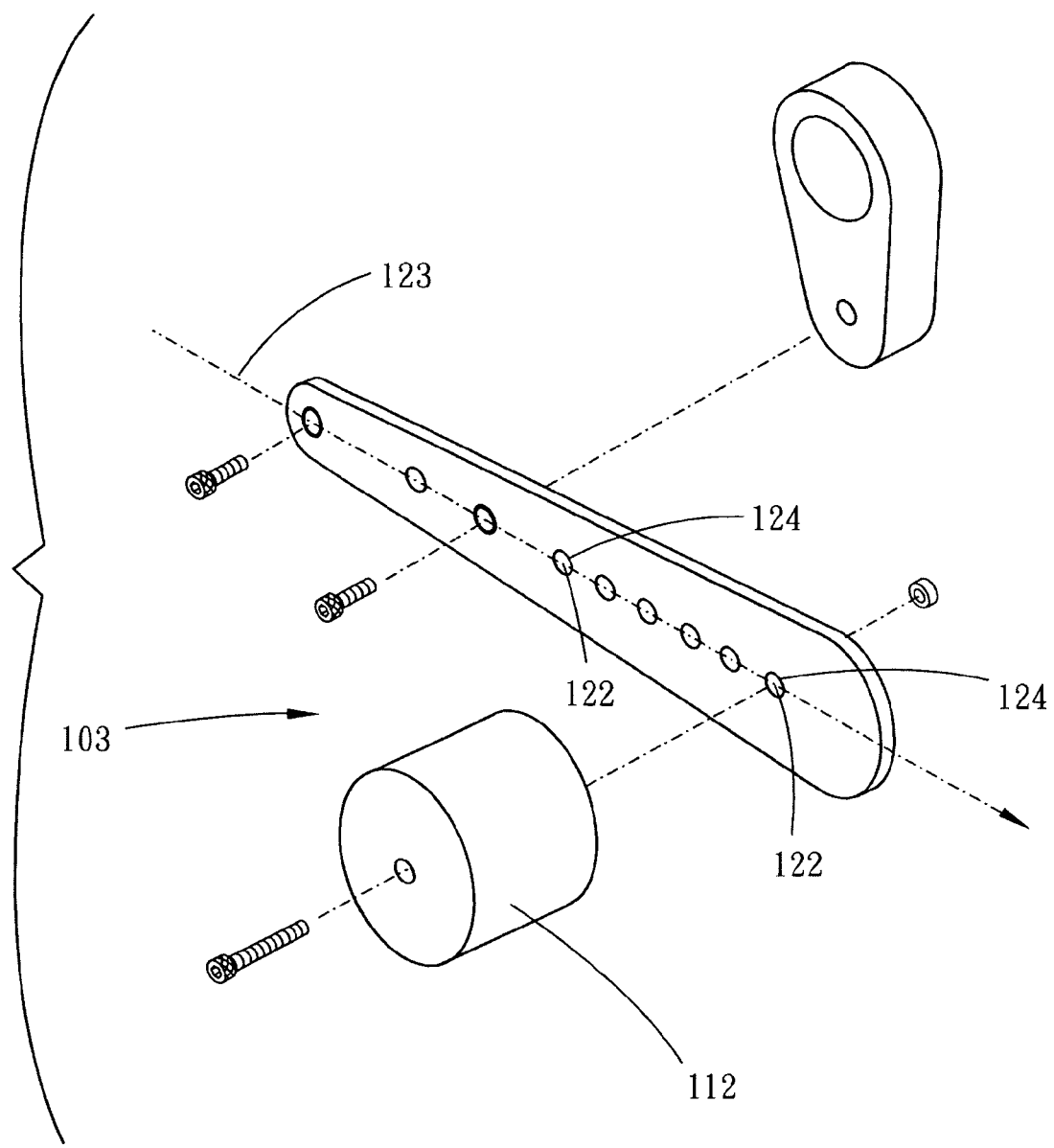
FIG. 6 is a perspective view of a pivot arm according to a second embodiment.

Referring to FIG. 6 a perspective view of a pivot arm 103 according to a second embodiment is shown. In the second embodiment, the pivot arm 103 has a plurality of joint points 122 arranged in order along a longitudinal direction of the pivot arm 103. Hence, the assemblers can decide how many counterbalances 112 to dispose in one specific joint point 122 or how many counterbalances 112 to dispose in selected joint points 122 respectively according to the degree of vibration of each scroll saw 60 to obtain a better vibration-reducing effect. Wherein, the joint point 122 can be a center of a bored hole 124 for example, which means the pivot arm 103 is bored with a plurality of bored holes 124 arranged in order along the longitudinal direction of the pivot arm 103, and the joint points 122 are the centers of these bored holes 124. The method of mounting the counterbalance 112 on the joint points 122 can be the same as described above with respect to the first embodiment.

In a third embodiment of the present disclosure, structurally similar to the first embodiment, a difference is exchanging the method of connecting the first end 90 of the driving member 74 with the block 72 and the method of connecting the third end 104 of the connector 100 with the block 72. Thus, in the third embodiment, the first end 90 of the driving member 74 is rotatably coaxially coupled on the block 72, the third end 104 of the connector 100 is pivotally connected to the block 72 around a pivot axis which is offset from the axis 96 of the shaft 88 and contacts the shortest line section 98 from the axis 96 of the shaft 88 to the periphery of the block 72.

The foregoing discussion discloses and describes merely exemplary embodiments of the present disclosure for purposes of illustration only. One skilled in the art will readily recognize from such discussion, and from the accompanying drawings and claims, that various changes, modifications, and variations may be made therein without departing from the spirit and scope of the disclosure as defined in the following claims.

What is claimed is:

1. A scroll saw comprising:
   a body;
   a frame mounted to said body and including an upper arm and a lower arm;
   a worktable mounted to said body and located between said upper and lower arms;
   a saw blade mounted to said upper and lower arms and passing through said worktable;
   an actuating device including a shaft and mounted to said body and configured to drive said shaft to rotate;
   a block eccentrically fastened with said shaft;
   a driving member including a first end rotatably connected to said block and a second end rotatably connected to said frame, wherein as said shaft is rotated, said upper and lower arms are synchronously driven to vertically move said saw blade; and
   a vibration-reducing device including a connector and a pivot arm pivotally connected to said body, said connector including a third end rotatably connected to said block, and a fourth end vertically opposed to the third end and rotatably connected to said pivot arm, wherein when said shaft is rotated, a motion of a center of gravity of said pivot arm in the vertical direction is opposite to a motion of a center of gravity of said frame.

2. The scroll saw according to claim 1, wherein said third end of said connector is rotatably coaxially coupled to said block and said first end of said driving member is pivotally mounted to said block around a pivot axis, said pivot axis and an axis of said block respectively offset from an axis of said shaft.

3. The scroll saw according to claim 2, wherein said first end of said driving member is rotatably coaxially coupled to said block and said third end of said connector is pivotally mounted to said block around a pivot axis, said pivot axis and an axis of said block respectively offset from an axis of said shaft.

4. The scroll saw according to claim 3, wherein said pivot axis contacts a shortest line segment defined from said axis of said shaft to a periphery of said block.

5. The scroll saw according to claim 1, wherein the center of gravity of said pivot arm and the center of gravity of said frame are respectively positioned at two opposite sides of said shaft.

6. The scroll saw according to claim 1, wherein said pivot arm includes two opposite end portions, wherein one of said two opposite end portions is pivotally mounted to said body, and said fourth end of said connector is pivotally mounted between said two opposite end portions.

7. The scroll saw according to claim 6, wherein said pivot arm includes at least one counterbalance mounted to the other one of said two opposite end portions of said pivot arm.

8. The scroll saw according to claim 1, wherein said pivot arm includes a plurality of joint points arranged along the longitudinal direction of said pivot arm, and at least one counterbalance is positioned on one of said joint points.

9. The scroll saw according to claim 1, wherein said second end of said driving member is pivotally connected to said lower arm of said frame.

10. A vibration-reducing device for use with a scroll saw, said scroll saw including a body, a frame, a saw blade, an actuating device, a block, and a driving member, said frame mounted to said body and including an upper arm and a lower arm, said saw blade mounted to said upper and lower arms, said actuating device including a shaft and mounted to said body and configured to drive said shaft to rotate, said block eccentrically fastened with said shaft, said driving member including a first end rotatably connected to said block and a second end rotatably connected to said frame, said vibration-reducing device comprising:
    a pivot arm pivotally mounted to said body; and
    a connector including a third end rotatably connected to said block and a fourth end vertically opposed to the third end and rotatably connected to said pivot arm, wherein when said shaft is rotated, motion of a center of gravity of said pivot arm in a vertical direction is opposite to a motion of a center of gravity of said frame.

11. The vibration-reducing device according to claim 10, wherein said third end of said connector is rotatably coaxially coupled to said block and said first end of said driving member is pivotally mounted to said block around a pivot axis offset from an axis of said shaft.

12. The vibration-reducing device according to claim 11, wherein said first end of said driving member is rotatably coaxially coupled to said block and said third end of said connector is pivotally mounted to said block around a pivot axis offset from an axis of said shaft.

13. The vibration-reducing device according to claim 12, wherein said pivot axis contacts a shortest line segment defined from said axis of said shaft to a periphery of said block.

14. The vibration-reducing device according to claim 10, wherein the center of gravity of said pivot arm and the center of gravity of said frame are respectively positioned at two opposite sides of said shaft.

15. The vibration-reducing device according to claim 10, wherein said pivot arm includes two opposite end portions, wherein one of said two opposite end portions pivotally connects to said body, and said fourth end of said connector is connected between said two opposite end portions.

16. The vibration-reducing device according to claim 15, wherein said pivot arm includes at least one counterbalance mounted to the other one of said two opposite end portions of said pivot arm.

17. The vibration-reducing device according to claim 10, wherein said pivot arm includes a plurality of joint points arranged along the longitudinal direction of said pivot arm, and at least one counterbalance is positioned on one of said joint points.

18. The vibration-reducing device according to claim 10, wherein said second end of said driving member is pivotally connected to said lower arm of said frame.

19. The scroll saw according to claim 1, wherein said pivot arm includes two horizontally opposite end portions, wherein one of said two opposite end portions is pivotally mounted to said body, and said fourth end of said connector is pivotally mounted between said two opposite end portions.

20. The vibration-reducing device according to claim 10, wherein said pivot arm includes two horizontally opposite end portions, wherein one of said two opposite end portions pivotally connects to said body, and said fourth end of said connector is connected between said two opposite end portions.

* * * * *